United States Patent [19]

Jones

[11] 4,042,757

[45] Aug. 16, 1977

[54] THERMO-ELECTRIC GENERATORS

[75] Inventor: Ivor Wynn Jones, Chester, England

[73] Assignee: Chloride Silent Power Limited, England

[21] Appl. No.: 673,556

[22] Filed: Apr. 5, 1976

[30] Foreign Application Priority Data

Apr. 10, 1975 United Kingdom ............... 14863/75

[51] Int. Cl.$^2$ ............................................. H01M 4/36
[52] U.S. Cl. ................................... 429/104; 429/120
[58] Field of Search ................. 427/11, 101, 104, 120, 427/17, 26, 29, 31, 33, 218

[56] References Cited

U.S. PATENT DOCUMENTS

| 1,843,698 | 2/1932 | Ruben | 429/101 X |
|---|---|---|---|
| 3,458,356 | 7/1969 | Kummer et al. | 429/11 |
| 3,535,163 | 10/1970 | Dzieciuch et al. | 429/104 |

*Primary Examiner*—C. F. Lefevour

*Attorney, Agent, or Firm*—Beveridge, De Grandi, Kline & Lunsford

[57] ABSTRACT

A thermo-electric generator of the kind making use of beta alumina ceramic through which sodium is circulated to produce an electric potential between the two surfaces of the ceramic has the ceramic in the form of a tube closed at its upper end and with its open end extending into liquid sodium. A heat pipe extends into the ceramic tube and there is an external tubular casing around the ceramic tube forming a closed structure for housing sodium in liquid and vapor form both inside and outside the ceramic tube. The heat pipe may be arranged either as a heat source or heat sink for the sodium inside the ceramic tube, the housing forming the heat sink in the former case of the heat source in the latter. The ceramic tube may, at its open end, be sealed to the housing and a pump used for pumping the sodium from the cold face to the hot face of the ceramic or capillary means may be used to circulate the sodium.

19 Claims, 4 Drawing Figures

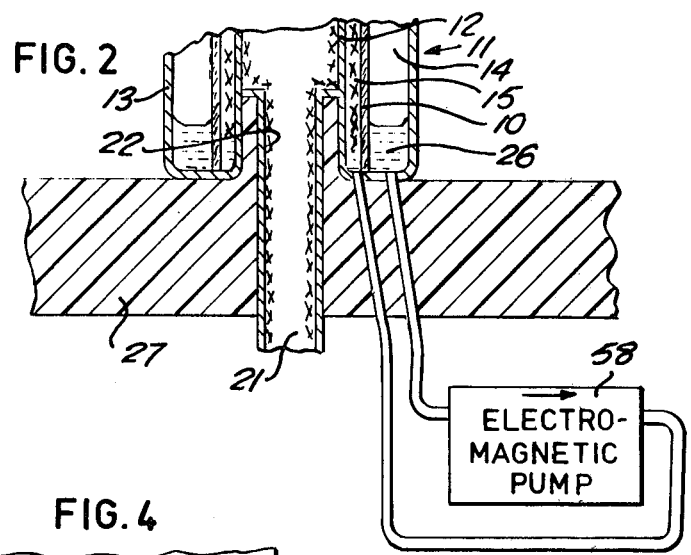
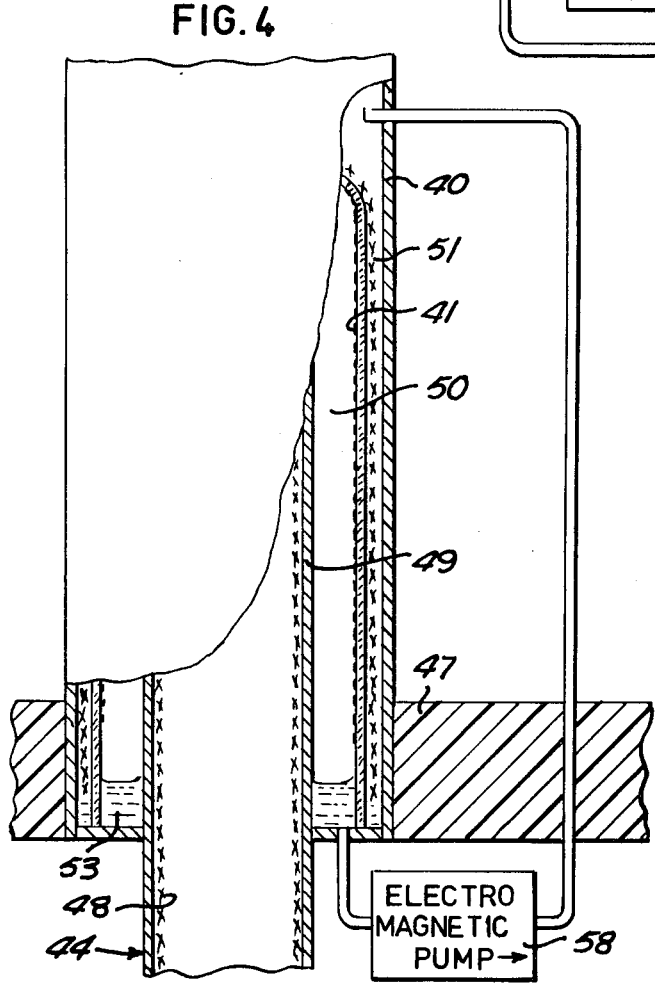

THERMO-ELECTRIC GENERATORS

BACKGROUND OF THE INVENTION

1. Field of the Invention

This invention relates to thermo-electric generators of the kind making use of beta alumina ceramic through which sodium is circulated to produce an electric potential between the two surfaces of the ceramic.

2. Prior Art

One form of such a device is described in U.S. Pat. No. 3,458,356, in which specification, one face of a disc of beta alumina ceramic is exposed to sodium vapour and the opposite face is exposed to a region of lower pressure and lower temperature. The sodium migrates through the ceramic material generating an electric potential between porous conductive layers on the faces of the ceramic. To provide a continuously-operating thermo-electric generator, the sodium passing through the ceramic is circulated back to the other face and heated.

A thermo-electric generator of this type would be particularly attractive for making use of a high temperature heat source; the thermo-electric generator could be used in series with a steam turbine, the thermo-electric generator working between some higher temperature and the maximum temperature of the steam turbine to thereby increase the overall thermal efficiency of electricity generation. Devices such as have been proposed heretofore however have not been suitable for large scale operation. One of the reasons for this is the problem of effecting a high temperature sodium resistant seal between the ceramic electrolyte and the sodium container, such a seal being necessary in constructions such as have been proposed heretofore.

SUMMARY OF THE INVENTION

According to one aspect of the present invention, a thermo-electric generator comprises outer and inner tubes formed of metal, the inner tube having a closed end within the outer tube and, remote from the closed end, being secured to the outer tube to form an annular region between the two tubes, sodium in this annular region, which sodium when the generator is operating is partly liquid and partly vapour, a beta alumina ceramic electrolyte tube having a closed end positioned within the outer tube and over the inner tube so that the open end of the ceramic tube dips into the liquid sodium in said annular region when the tubes are in an upright position with the closed end of the inner tube above the point where the inner and outer tubes are joined, the ceramic tube thereby separating two regions containing sodium liquid and vapour, and a heat source and heat sink, the heat sink being arranged to cool either the inner tube or the outer tube and to cool also the region where the two tubes are joined and the heat source being arranged to heat the other of these two tubes, the electrolyte tube, on its surface facing the cooled tube, having a conductive coating which is porous to sodium, said means for recirculating condensed sodium from the region between electrolyte and the cooled tube to the surface of the electrolyte facing the heated tube. So that the sodium remains molten, the heat sink is conveniently at a temperature of about 250–300° C.

In this thermo-electric generator, the ceramic electrolyte separates two regions, one of which is at a higher temperature than the other and hence has a higher sodium vapour pressure. The sodium from the hotter, higher pressure side passes through the electrolyte to the cooler side where it condenses. In order to expand through the electrolyte, the sodium has to ionize, so generating an electric potential between the aforesaid conductive coating on one surface of the electrolyte and the sodium over the other surface of the electrolyte. Electrical current passes around the external circuit and electrons recombine with ions at the interface between the solid electrolyte and the porous electrode. Thermal energy is converted into electrical energy. The open end of the ceramic tube extends into the liquid sodium. The means for recirculating the condensed sodium from the region between the electrolyte and the cooled tube to the surface of the electrolyte facing the heated tube may comprise capillary means between the ceramic tube and said cooled tube. In this case, the liquid sodium into which the electrolyte tube dips, together with the electrolyte tube, separates the two regions of sodium vapour at different pressures, the liquid sodium on the two sides of the electrolyte tube being at slightly different levels to balance the different vapour pressures. In this construction, no sealing is necessary between the ceramic electrolyte tube and the sodium container. Alternatively, a pump, preferably an electromagnetic pump, may be used for recirculating the condensed sodium; in this case the electrolyte tube has to be sealed to the sodium container constituted by said inner and outer tubes but the seal is in the liquid sodium adjacent the heat sink so thereby avoiding any necessity of a high temperature sodium resistant seal.

With the arrangement described above, the inner and outer tubes may be formed of the same metal, for example corrosion-resistant steel; they can therefore be made integral or joined to form a fluidtight junction. In one construction therefore the outer tube, at its lower end, is formed with a re-entrant portion constituting the inner tube.

The electrolyte is made conductive on one of its two surfaces, specifically the surface facing the cooled tube, with a conductive layer which is porous to permit the passage of sodium and thus a potential is generated between this conductive surface and the sodium on the other face of the electrolyte, which sodium is electrically in contact with the metal tubes. Conveniently the conductive surface of the ceramic electrolyte tube is electrically connected to a lead-out passing through an insulator in the outer tube or in an end closure for the outer tube.

As previously mentioned, recirculation of molten sodium may be effected by electromagnetic pumping. Preferably in this case also, capillary or wick means are provided between the hot face of the ceramic electrolyte tube and the heat source to maintain a layer of liquid sodium over the surface of the electrolyte tube. This enables the whole or substantially the whole of the area of the ceramic electrolyte tube to be effectively used for thermo-electric generation by the passage of sodium vapour. The heat source is preferably shaped to leave an annular region of substantially uniform thickness between the surface of the electrolyte and the facing surface of the heat source. This region may be maintained full of sodium by the recirculation system. The amount of energy required for pumping is negligible compared with the electrical output of the generator.

The heat source or heat sink on the inside of the ceramic electrolyte tube is preferably constituted by a heat pipe comprising a closed container, formed at least in part by said inner tube and containing an evaporable fluid (which is chosen in accordance with the required temperature of operation) the heat pipe extending outwardly from the end of the outer tube to the heat source or heat sink according as to whether the heat pipe is to heat or cool the sodium.

The invention furthermore includes within its scope a thermo-electric generator comprising a beta-alumina ceramic electrolyte in the form of a tube closed at one end, the open end facing downwards and dipping into liquid sodium, a housing around the outside of the electrolyte tube, said housing containing said liquid sodium and a heat pipe, forming a heat source or heat sink, extending into said electrolyte tube through the open end thereof.

The heat pipe, if it is to act as a heat source, preferably has an outer surface lying closely adjacent the inner surface of the electrolyte tube. A wick, e.g. flame sprayed metal powder or a woven metal mesh may be provided between the heat pipe and electrolyte. A preferred form of wick comprises spaced thin layers of electrolytically formed iron foil with apertures, e.g. punctured, to allow for exchange of sodium between the layers.

BRIEF DESCRIPTION OF THE DRAWINGS

FIGS. 2 and 4 illustrate diagrammatically modifications of the structures of FIGS. 1 and 3 respectively.

DESCRIPTION OF THE PREFERRED EMBODIMENTS

Figure 1:
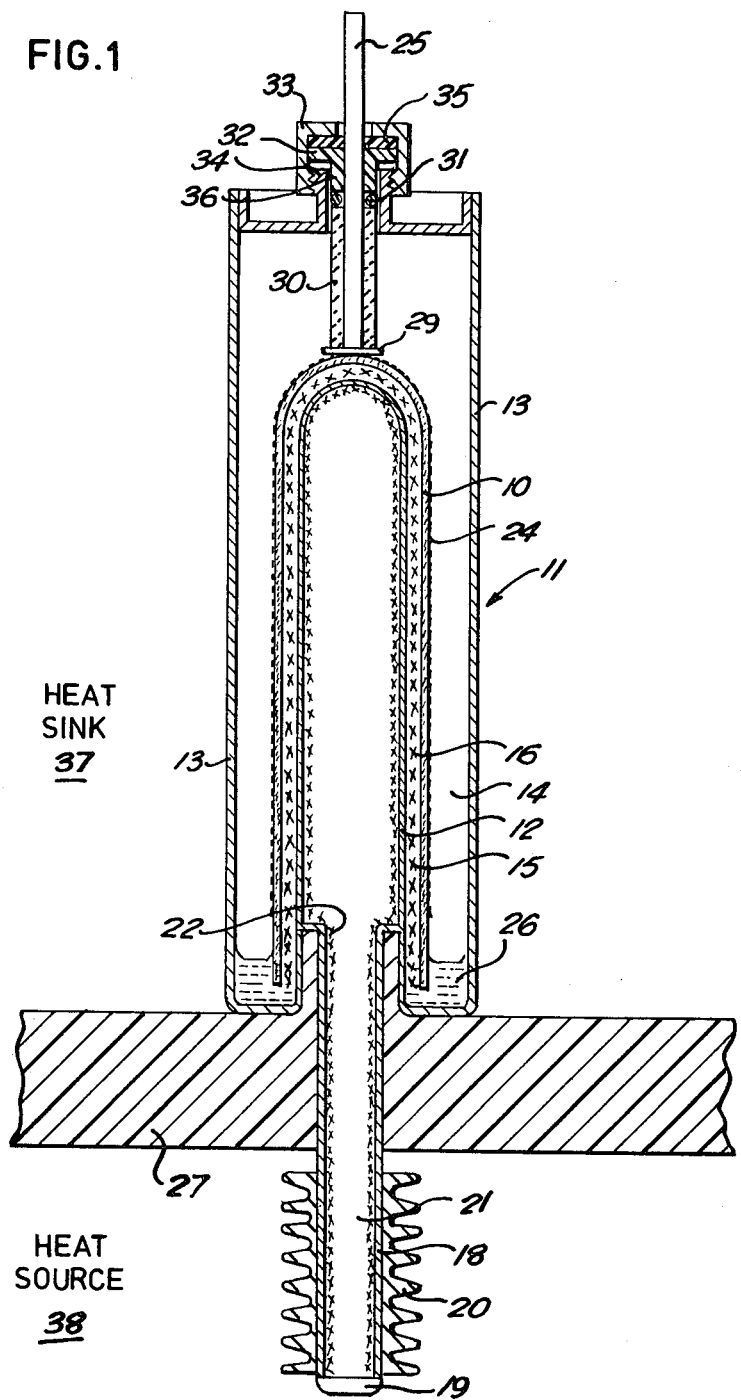
FIGS. 1 and 3 are each a vertical section through a thermo-electric generator.

In each of the FIGS. 1 and 2 the generator has circular symmetry about a longitudinal axis which is upright when the generator is operating. Referring to FIG. 1, there is shown a thermo-electric generator having an electrolyte tube 10 closed at its upper end. This tube 10 is a beta-alumina ceramic and may be formed by known ceramic technology as a simple cylindrical shape. The ceramic tube 10 is contained within a cylindrical housing 11 which is formed into a re-entrant shape having inner and outer tubes 12, 13 such that two annuli 14, 15 are formed. The outer annulus 14 is between the outside surface of the ceramic 10 and the inside surface of the outer housing 13. The inner annulus 15 is formed between the inside surface of the ceramic tube 10 and the outside surface of the re-entrant or inner tube of the housing, which inner tube is closed at its upper end. The inner and outer tubes 12, 13 may be formed integrally as shown or may be joined. The open end of the ceramic tube 10 is disposed close to the region of the housing 11 where the re-entrant portion or inner tube of the housing 12 is joined to the outer tube 13 of the housing. However, the ceramic electrolyte is not joined to the housing at this point. Thus the two annuli 14, 15 are freely connected together at this point, and sodium, which is contained within the housing 11, is able to flow physically from one annulus to another.

In this embodiment, the thickness of the outer annulus 14 is 3–10 mm and preferably is 4–6 mm. The thickness of the inner annulus 15 is 0.1–2 mm, preferably 0.5–1 mm. The inner annulus 15 is packed with a porous metallic or non-metallic material to promote sodium transport, and distribution by wicking in the annulus. A porous metal wick 16 is shown. This material may be flame sprayed metal powder, or woven metal mesh, but preferably it is formed from spaced thin layers of electrolytically formed iron foil which have been punctured to allow exchange of sodium between the layers.

The annulus 15 is maintained full of sodium in liquid and vapour phases by recirculation of condensed sodium as previously described; in this particular embodiment, the sodium is drawn up by the wick 16 so as to keep the inner surface of the ceramic tube 10 wetted with liquid sodium.

The re-entrant portion of the housing, that is the inner tube 12, is attached to a tubular extension member 18, which extends beyond the open end of the ceramic tube 10 by 100 to 1000 mm, preferably 200 to 500 mm. The tubular extension member 18, which may be required to retain its integrity and resist corrosion when exposed to the combustion products of fossil fuels at an elevated temperature, may be formed of corrosion-resistant steels such as the AlSl 446 alloy which contains 28% chromium, or one of the Nimonic series of nickel-based high temperature alloys. In less arduous conditions, where heat is provided at a lower temperature or in less corrosive form, e.g. from a gas-cooled nuclear reactor, it may be possible to use a less exotic material, e.g. an austenitic stainless steel of the EN 58 B type. The lower end of the tubular extension member 18 is closed by a welded closure 19. The external surface may be finned, as shown at 20 to promote heat transfer from the heat source to the thermo-electric generator.

The inside of the tubular extension member 18 and the inside of the re-entrant portion of the housing, i.e. the inner tube 12, together provide the boundaries of a shaped closed container 21. This boundary is lined with a porous wick material 22 similar to that specified for the inner annulus 15 adjacent to the inside surface of the ceramic tube 10. This shaped closed container contains a quantity of sodium, slightly in excess of that required to impregnate the wick, and is sealed by an appropriate technique, e.g. electron beam welding after evacuation at an elevated temperature and baking. This process eliminates residual gases which can impede heat transfer within the container. This container 21 constitutes a heat pipe. It can be seen that the thermo-electric generator shown in FIG. 1 contains as an integral part of its construction a heat pipe 21 which is able to absorb heat from a heat source (surrounding the lower portion of the extension tube 18) and distribute this heat uniformly around the active electrolyte/electrode interface of the thermo-electric generator. This distribution of heat is effected by evaporation of sodium at the hotter regions of the container surface, and condensation in the cooler regions. The quantity of heat transferred is that of the latent heat of evaporation of the liquid metal. The rate of heat transfer is determined by the sonic velocity of the vapour stream, and the wicking velocity of the liquid metal in the wick. Appropriate heat transfer rates can be achieved in a container of these dimensions while the temperature of the external surface of the container remains essentially constant. This final criterion is important because it is only under these conditions that the thermo-electric generator works uniformly over the electrolyte area, and therefore maximum electrical output is achieved for a given maximum temperature of the heat source.

The external surface of the electrolyte tube 10 is coated with a porous layer 24 of a refractory metal, preferably molybdenum or tungsten, deposited by a suitable process, preferably chemical vapour deposition. The structure of this layer is such that it allows electronic transference at the ceramic/electrolyte interface, allows free diffusion of sodium vapour from the interface to the condenser and has adequate current carrying capability to carry and distribute current from a current collection lead 25 to be described later. To achieve this the average thickness of the coating is preferably 1 to 2 mm with a resistivity of not greater than $10^{-4}$ ohm cm. In another embodiment the electrode may be shaped comprising regions of varying thickness and porosity to achieve the optimum degree of porosity to sodium vapour and capability of carrying and distributing current. An extreme form of such an embodiment is a porous layer of molybdenum less than 0.1 mm thick, contacted by a set of wires or strips of metal held in contact with the coated ceramic surface and also attached to the main current lead. The density of the current distributing material may be tapered linearly from zero at the open end of the ceramic tube to maximum thickness at the closed end (near the current lead 25) reflecting the linear increase in current along the cell (if the ceramic current density is uniform along the length of the cell).

For 2-5 cm from the open end of the electrolyte tube 10, the external surface is not coated with porous conducting electrode material. This is because the open end of the ceramic tube is immersed in liquid sodium 26 to a depth of about 1 cm. If the porous electrode material extended beneath the surface of the sodium metal, the thermo-electric generator would be shorted out.

The external housing of the thermo-electric generator disposed concentric with the electrolyte tube, i.e. the outer tube 13, is the condenser of the thermo-electric generator. The external surface may be plain or finned to promote heat transfer to the surroundings by natural convection in air or by means of forced cooling in a gas stream. The temperature of the condenser would be maintained at about 250°-300° C but this temperature is not very critical for efficient operation of the device. A layer of thermal insulation 27 separates the source heat transfer surface (i.e. the extension member 18) from the condenser heat transfer surface (tube 13), and this insulation 27 is extended as shown at 28 within the geometry of the electrolyte tube 10 above the level of the liquid sodium pool 26 to the point where the re-entrant portion 12 of the housing is attached to the extension member 18. The aforementioned current lead 25 is flanged at its lower end as shown at 29, and engages with a ceramic insulation sleeve 30 which surrounds, and insulates the current lead 25. Above the ceramic sleeve 30, there is a sealing ring 31 made from an insulating elastomeric material, and a thrust ring 32. All of these are compressed by a nut 33 which engages on a threaded member 34 which in turn forms an end closure to the outer housing 13, to which it is attached by welding. The thrust ring 32 is insulated from the nut 33 and the outer housing 13 by washer 35 and a sleeve 36, both manufactured from filamic, a commercial high temperature insulating material. It may be seen that as well as providing a seal by compression of the 'O' ring 31, tightening of the nut 33 also presses the flanged lead 25, 29 against the porous metal electrode 24 on the outside surface of the electrolyte 10, thereby effecting good electrical contact, and also presses the electrolyte tube 10 against the inner tube 12 of the housing. However, sealing and electrical contact between the lead 25 and the porous electrode 124 may be achieved by other means.

The region 37 around the tube 13 constitutes a heat sink and the region 38 around the tube 18 forms a heat source. Heat from the heat source is transferred by the heat pipe 18, 12 to heat the sodium in the inner annulus 15. The pressure in this region 15 therefore rises and sodium passes through the electrolyte, in the form of sodium ions, to the outer surface with its porous coating 24 where the ions re-combine with electrons to produce sodium which is condensed in the outer annulus 14. In this embodiment, sodium is transferred back from the outer annulus 14 to the inner annulus 15 passing under the bottom of the open end of the electrolyte tube 10 and being drawn up by the wick 16 to keep the inner surface of the electrolyte wetted with sodium. The annulus 15 is substantially filled with sodium vapour, the difference in liquid levels on the two sides of the electrolyte tube corresponding to the difference in vapour pressures.

FIG. 2 illustrates a modification of the construction of FIG. 1 in which an electromagnetic pump 38 is provided for pumping the liquid sodium from the outer annulus 14 to the inner annulus 15 to maintain the required pressure difference. In this case, the open end of the electrolyte tube 10 has to be sealed to the sodium container 11; this seal however is in the liquid sodium, maintained liquid by the adjacent heat sink 37 and thus is not exposed to high temperature sodium vapour.

Figure 3:
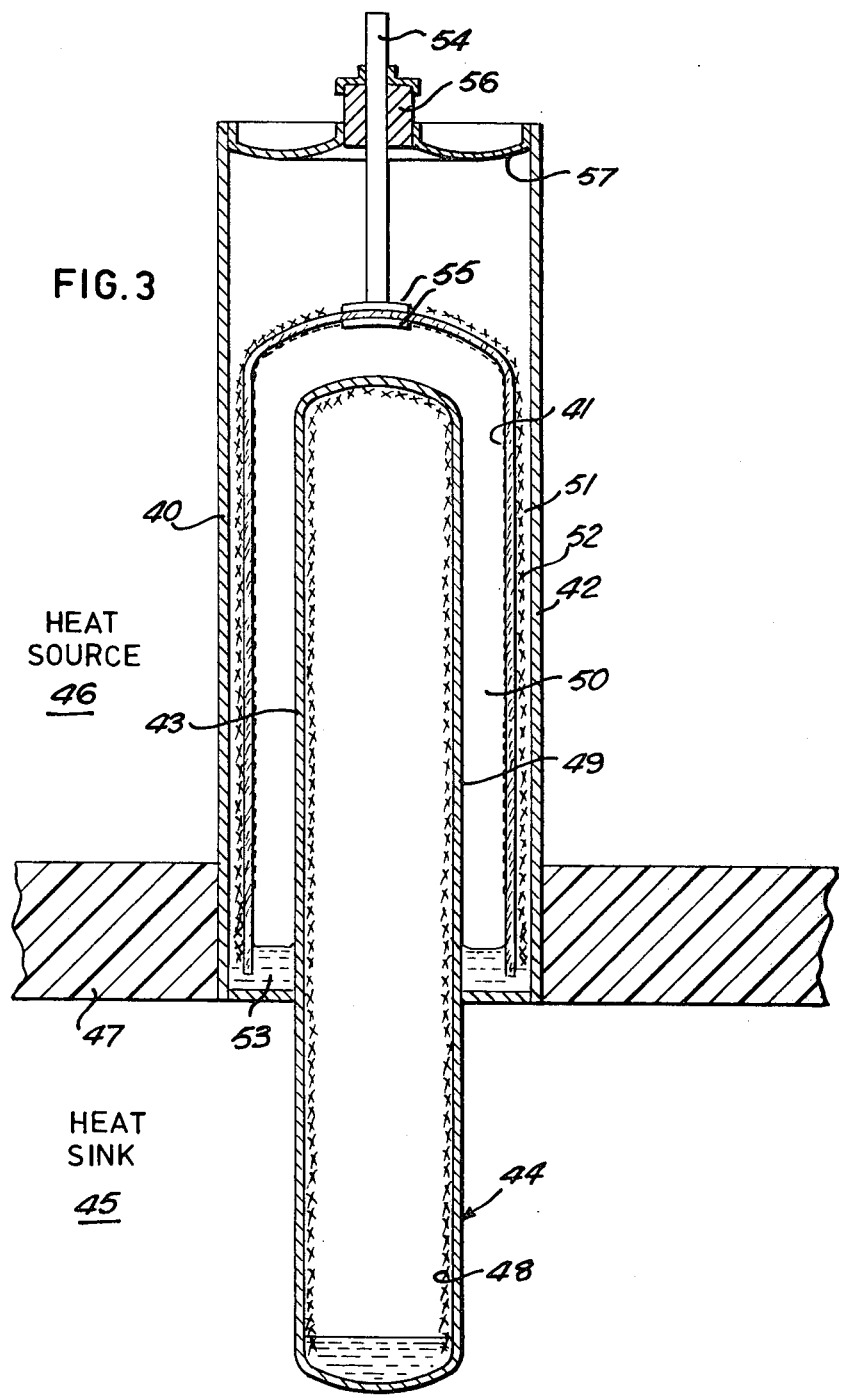

FIG. 3 shows another embodiment of the invention, again based on a cylindrical electrolyte tube 40 closed at its upper end, but the condenser is now within the electrolyte tube, and the porous metal electrode 41 is formed on the internal surface of the electrolyte tube 40. Many of the components have a similar function to the embodiment in FIG. 1, and they will not be discussed unless a distinction can be drawn between their functions in the two embodiments.

The main housing of the thermo-electric generator of FIG. 3 comprises an outer housing 42 with a re-entrant member 43 which is also extended at 44 below the main housing into a lower thermal enclosure forming a heat sink 45. The main housing 42, is substantially enclosed in an upper thermal enclosure constituting a heat source 46. The two thermal enclosures are separated by a thermally insulating layer 47.

The re-entrant member 43 and its extension 44 form a closed continuous chamber, which is lined with porous material 48 to form a wick, and the centre is free for vapour flux. Thus this chamber acts as a heat pipe and maintains a uniform temperature at its periphery, and at the same time transports heat from the re-entrant regions i.e. member 43 to the extended region 44 which is cooled by an appropriate means. The external surface in the extended region 44 may be finned to improve heat transfer, by natural or forced convection. Since the central container has to function as a heat pipe at the condenser temperature of 200°-300° C, it works more efficiently if an appropriate heat pipe fluid for this temperature range is specified. Mercury is a suitable fluid for this temperature range.

By contrast with FIG. 1 it may be seen from FIG. 3 that the inner annulus 50 is now the wider annulus, its dimensions being in the range of 3-10 mm and preferably being in the range 4-6 mm. The outer annulus 51 is thinner being formed by a close fit between the external surface of the cylindrical electrolyte 40 and the internal surface of the outer facing 42. The outer annulus 51 is packed with a porous fibrous or layered structure 52 suitable to effect transport of sodium by a wicking mechanism. The condensed sodium is recirculated into this outer annulus 51 by an electromagnetic pump (not shown).

The inner surface of the electrolyte tube 40 is lined with a porous electrode structure 41 of the form described with reference to FIG. 1. This layer 41 extends to within a short distance of the open end of the electrolyte tube 40, but does not make contact with a condensed pool 53 of liquid sodium which forms in this region: that would short-out the thermo-electric generator.

A current lead 54 extends through a hole drilled in the closed end of the ceramic tube 40, and fastenings 55 secure electrical contact between the lead 54 and the porous electrode structure 41. This lead 54 passes out of the outer housing 42 through an alumina bush 56, which is sealed to the lead 54 and to an end closure 57 by a reactive metal brazing alloy containing Zirconium or Titanium, which may be used for direct brazing of metals to ceramics and is resistant to sodium metal and vapour at elevated temperatures.

The embodiment of FIG. 3 makes use of capillary forces in a wick to recirculate sodium in the thermo-electric generator. Alternatively, as shown in FIG. 4, the sodium may be recirculated by an electromagnetic pump 58 arranged close to the condensed sodium pool. As in FIG. 2, the electrolyte tube would have to be sealed to the sodium container but this seal is in the liquid sodium immediately adjacent the heat sink and thus is not at a high temperature.

A plurality of thermo-electric generators may extend between one heat source thermal enclosure and a second heat sink thermal enclosure. The thermo-electric generators may be electrically connected in series or series/parallel to suit the application.

The thermo-electric generator may typically be used in conjuction with a source (such as a nuclear reactor or a fossil fuel burner providing heat energy at a temperature in the range 500° to 1300° C.

I claim:

1. A thermo-electric generator comprising outer and inner tubes formed of metal and constituting a first electrode, the inner tube having a closed end within the outer tube and, remote from the closed end being secured to the outer tube to form an annular region between the two tubes, sodium in this annular region, which sodium, when the generator is operating, is partly liquid and partly vapor, a beta alumina ceramic electrolyte tube having a closed end positioned within the outer tube and over the inner tube so that the open end of the ceramic tube dips into the liquid sodium in said annular region when the tubes are in an upright position with the closed end of the inner tube above the point where the inner and outer tubes are joined, the ceramic tube thereby separating two regions containing sodium liquid and vapor, a heat source and heat sink, the heat sink being arranged to cool either the inner tube or the outer tube and to cool also the region where the two tubes are joined and the heat source being arranged to heat the other of these two tubes, whereby a temperature difference is maintained between the regions inside and outside the electrolyte tube, the electrolyte tube, on part of its surface exposed to sodium vapor and facing the cooled tube, having a conductive coating which is porous to sodium and which constitutes a second electrode, a current output lead connected to said conductive coating, and means for recirculating condensed sodium from the region between the electrolyte and the cooled tube to the surface of the electrolyte facing the heated tube, whereby an electric potential is developed between said output lead and the metal inner and outer tubes which constitute a second electrical output conductor.

2. A thermo-electric generator as claimed in claim 1 wherein said means for recirculating condensed sodium comprises capillary means between the ceramic tube and said cooled tube.

3. A thermo-electric generator as claimed in claim 1 wherein the open end of the ceramic tube is sealed to the inner and outer tube structure to form a liquid-tight joint and wherein said means for recirculating condensed sodium comprises a pump arranged for pumping liquid sodium from one region adjacent one face of the ceramic tube to the other face.

4. A thermo-electric generator as claimed in claim 1 wherein the heat sink is at a temperature of 250°-300° C.

5. A thermo-electric generator as claimed in claim 1 wherein the inner and outer tubes are formed of the same metal.

6. A thermo-electric generator as claimed in claim 1 wherein the conductive surface of the electrolyte is electrically connected to a lead-out passing through an insulator in the outer tube or in an end closure for the outer tube.

7. A thermo-electric generator as claimed in claim 1 wherein the heat source is shaped to leave an annular region of substantially uniform thickness between the surface of the electrolyte and the facing surface of the heat source.

8. A thermo-electric generator as claimed in claim 1 wherein the heat source or heat sink on the inside of the electrolyte is constituted by a heat pipe comprising a closed container formed, at least in part, by said inner tube and containing an evaporable fluid, the heat pipe extending outwardly from the end of the outer tube to the heat source or heat sink according as to whether the heat pipe is to heat or cool the sodium.

9. A thermo-electric generator as claimed in claim 3 wherein the pump is an electromagnetic pump.

10. A thermo-electric generator as claimed in claim 3 wherein capillary means are provided for maintaining a layer of liquid sodium over the surface of the ceramic tube facing the heated tube.

11. A thermo-electric generator as claimed in claim 5 wherein the inner and outer tubes are integral.

12. A thermo-electric generator as claimed in claim 5 wherein the outer tube, at its lower end, is formed with a re-entrant portion constituting the inner tube.

13. A thermo-electric generator comprising a beta alumina ceramic electrolyte tube closed at one end and with its open end facing downwards, a metal housing around the outside of the electrolyte tube, said housing containing liquid sodium and sodium vapor with the open end of the electrolyte tube extending downwardly into the liquid sodium, a conductive coating which is porous to sodium over part of the outer surface of said electrolyte tube above the level of the liquid sodium, said conductive coating forming a first electrode, a current lead electrically connected to said conductive coating and extending outwardly through said housing but insulated therefrom, a heat source, a heat pipe extending from said heat source into said electrolyte tube through the open end thereof to transfer heat from the heat source to the sodium within the electrolyte tube, a heat sink around said metal housing, and pump means arranged for circulating sodium from the region outside the electrolyte tube to the region inside the electrolyte tube to be vaporized therein and to pass through the electrolyte material whereby an electric potential is maintained between the output lead connected to said conductive coating and the metal housing which constitutes a second electrode.

14. A thermo-electric generator as claimed in claim 13 wherein the heat pipe has an outer surface lying closely adjacent the inner surface of the electrolyte tube.

15. A thermo-electric generator as claimed in claim 13 wherein a wick is provided between the heat pipe and electrolyte.

16. A thermo-electric generator as claimed in claim 15 wherein the wick comprises a flame sprayed metal powder or a woven metal mesh.

17. A thermo-electric generator as claimed in claim 15 wherein the wick comprises spaced thin layers of electrolytically formed iron foil with apertures to allow for exchange of sodium between the layers.

18. A thermo-electric generator comprising a beta alumina ceramic electrolyte tube closed at one end and with its open end facing downwardly, a metal housing around the outside of the electrolyte tube, said housing containing liquid sodium and sodium vapor, the open end of the electrolyte tube extending downwardly into the liquid sodium, a conductive coating which is porous to sodium over part of the inner surface of the electrolyte tube above the level of the liquid sodium, said conductive coating forming a first electrode, a current lead electrically connected to said conductive coating and extending outwardly of the housing but insulated therefrom, a heat source around said metal housing, a heat sink, a heat pipe extending from said heat sink into said electrolyte tube through the open end thereof to cool the sodium within the electrolyte tube, and pump means arranged for circulating sodium from the region inside the electrolyte tube to the region outside the electrolyte tube to be evaporated by heat from the heat source and to pass through the electrolyte tube so as to maintain an electric potential between said lead and the metal housing which constitutes a second electrode.

19. A thermo-electric generator as claimed in claim 18 and having a wick around the electrolyte tube between that tube and said housing.

* * * * *